US012120709B2

(12) United States Patent
Su

(10) Patent No.: US 12,120,709 B2
(45) Date of Patent: Oct. 15, 2024

(54) RTT-AWARE SCHEDULING OF DOWNLINK TRANSMISSIONS TO ENERGY-CONSTRAINED DEVICES ON LOW-POWER WIDE-AREA NETWORKS

(71) Applicant: HUGHES NETWORK SYSTEMS, LLC, Germantown, MD (US)

(72) Inventor: Chi-Jiun Su, Rockville, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 212 days.

(21) Appl. No.: 17/498,608

(22) Filed: Oct. 11, 2021

(65) Prior Publication Data
US 2023/0113401 A1   Apr. 13, 2023

(51) Int. Cl.
*H04W 72/27* (2023.01)
*H04W 72/0446* (2023.01)
(Continued)

(52) U.S. Cl.
CPC ....... *H04W 72/27* (2023.01); *H04W 72/0446* (2013.01); *H04W 72/542* (2023.01); *H04W 88/16* (2013.01)

(58) Field of Classification Search
CPC ............. H04W 72/27; H04W 72/0446; H04W 72/542; H04W 88/16; H04W 24/02;
(Continued)

(56) References Cited

U.S. PATENT DOCUMENTS 11,206,549 B1 * 12/2021 Eyuboglu ......... H04W 72/1273
2004/0057543 A1 * 3/2004 Huijgen ............... H04J 3/0682
375/356
(Continued)

FOREIGN PATENT DOCUMENTS

| CN | 110690953 | 4/2020 |
| KR | 102038104 | 10/2019 |

OTHER PUBLICATIONS

Boisguene, et al. "A survey on NB-IoT downlink scheduling: Issues and potential solutions." 2017 13th International Wireless Communications and Mobile Computing Conference (IWCMC). IEEE, 2017, doi: 10.1109/IWCMC.2017.7986344, pp. 547-551.
(Continued)

*Primary Examiner* — Chirag G Shah
*Assistant Examiner* — Joshua Smith
(74) *Attorney, Agent, or Firm* — Sheppard, Mullin, Richter & Hampton LLP

(57) ABSTRACT

Some implementations of the disclosure relate to a backend server that is configured to perform operations including: determining one or more radio frequency (RF) gateways that are candidates for communicating with an end device over a RF link in a low-power wide-area network (LPWAN); obtaining, for each of the one or more RF gateways, a round trip time (RTT) of communications between the backend server and the RF gateway over a backhaul link; determining whether at least one of the one or more RTTs exceeds a threshold value; and when at least one of the one or more RTTs exceeds the threshold value, increasing a configured time interval between transmission of an uplink message by the end device and a downlink receive time slot in which the end device is configured to listen for a downlink message.

18 Claims, 9 Drawing Sheets

(51) Int. Cl.
*H04W 72/542* (2023.01)
*H04W 88/16* (2009.01)

(58) Field of Classification Search
CPC ............. H04W 24/08; H04W 28/0226; H04W 28/0231; H04W 28/0247; H04W 4/70; H04L 41/142; H04L 43/0829; H04L 43/0876; H04L 43/0864; H04L 43/16; H04L 47/28; Y02D 30/70
See application file for complete search history.

(56) References Cited

U.S. PATENT DOCUMENTS

| | | | | |
|---|---|---|---|---|
| 2013/0091268 | A1* | 4/2013 | Bopardikar | H04L 67/02 709/224 |
| 2016/0094462 | A1* | 3/2016 | Heitz | H04W 80/06 370/231 |
| 2017/0019803 | A1* | 1/2017 | Nguyen | H04L 43/0864 |
| 2018/0124729 | A1* | 5/2018 | Hanson | H04W 56/0065 |
| 2019/0124686 | A1 | 4/2019 | Lo et al. | |
| 2021/0051561 | A1* | 2/2021 | Gupta | H04L 43/0864 |
| 2022/0416948 | A1* | 12/2022 | Yang | H04W 80/02 |

OTHER PUBLICATIONS

Cardwell, Neal, et al. "BBR: congestion-based congestion control." Communications of the ACM 60.2 (2017), DOI: 10.1145/3009824, pp. 58-66.

Di Vincenzo, et al.. "Improving downlink scalability in LoRaWAN." ICC 2019-2019 IEEE International Conference on Communications (ICC). IEEE, 2019, doi: 10.1109/ICC.2019.8761157, pp. 1-7.

Farrell, S, "RFC 8376: Low-Power Wide Area Network (LPWAN) Overview," Internet Engineering Task Force (IETF), 2018. [Online]. Available: https://tools.ietf.org/html/rfc8376. 43 pages.

Iyengar, et al., "QUIC Loss Detection and Congestion Control—draft-ietf-quic-recovery-34," Internet Engineering Task Force (IETF), Jan. 2021. [Online]. Available: https://tools.ietf.org/html/draft-ietf-quic-recovery-34, 52 pages.

Strowes, Stephen D. "Passively measuring TCP round-trip times." Communications of the ACM 56.10 (2013): 57-64.

International Search Report and Written Opinion mailed Jan. 18, 2023 for International Application No. PCT/US2022/045407, filed Sep. 30, 2022.

* cited by examiner ated and low cost. It offers long-range connectivity to cheap, battery-operated devices, which require the transmission of small amounts of data at regular intervals of time over a long lifespan. In LPWAN, end devices save on battery life by receiving downlink transmissions during only a few, pre-specified time slots of short length.

RTT-AWARE SCHEDULING OF DOWNLINK TRANSMISSIONS TO ENERGY-CONSTRAINED DEVICES ON LOW-POWER WIDE-AREA NETWORKS

BACKGROUND

A low-power wide-area network (LPWAN) or low-power network (LPN) is a type of wireless telecommunication wide area network suitable for use with Internet of Things (IoT) devices such as battery-powered sensors. It is characterized by long range transmissions (e.g., on the order of kilometers), low power, low data rates (e.g., on the order of kbit/s) and low cost. It offers long-range connectivity to cheap, battery-operated devices, which require the transmission of small amounts of data at regular intervals of time over a long lifespan. In LPWAN, end devices save on battery life by receiving downlink transmissions during only a few, pre-specified time slots of short length.

SUMMARY

Implementations of the disclosure relate to adaptively scheduling downlink transmissions to energy-constrained devices in a LPWAN based on the backhaul link Round Trip Time (RTT) between an RF gateway and one or more backend servers.

In one embodiment, a backend server includes: one or more processors; and one or more non-transitory computer-readable storage medium storing instructions that, when executed by the one or more processors, cause the backend server to perform operations comprising: determining one or more radio frequency (RF) gateways that are candidates for communicating with an end device over a RF link in a LPWAN; obtaining, for each of the one or more RF gateways, a round trip time (RTT) of communications between the backend server and the RF gateway over a backhaul link; determining whether at least one of the one or more RTTs exceeds a threshold value; and when at least one of the one or more RTTs exceeds the threshold value, increasing a configured time interval between transmission of an uplink message by the end device and a downlink receive time slot in which the end device is configured to listen for a downlink message. The end device may be a battery powered device.

In some implementations, obtaining for each of the one or more RF gateways, the RTT of communications between the backend server and the RF gateway over a backhaul link, comprises: passively measuring, using a transport layer network protocol, the RTT. In some implementations, passively measuring, at the backend server, using the transport layer network protocol, the RTT, comprises: reading, via an application programming interface (API) provided for the transport layer network protocol, real time values of protocol parameters or statistics corresponding to the RTT.

In some implementations, obtaining for each of the one or more RF gateways, the RTT of communications between the backend server and the RF gateway over a backhaul link, comprises: passively measuring, using an application layer network protocol, the RTT. In some implementations, passively measuring, using the application layer network protocol, the RTT, comprises: transmitting a data packet from the backend server to the RF gateway; in response to transmitting the data packet, receiving an acknowledgement at the backend server from the RF gateway; and determining the RTT based on a transmission time of the data packet and a reception time of the acknowledgement.

In some implementations, the threshold is less than or equal to the configured time interval. In some implementations, increasing the configured time interval comprises: increasing the configured time interval such that the configured time interval is at least greater than a maximum RTT of the one or more RTTs.

In some implementations, the operations further comprises: after increasing the configured time interval, deploying the end device in the LPWAN. In some implementations, determining one or more RF gateways that are candidates for communicating with the end device over the RF link in the LPWAN, comprises: determining a geographical location of the end device; and determining that the geographical location is within a coverage area where each of the one or more RF gateways is capable of receiving uplink transmissions form the end device.

In some implementations, the operations further comprise: scheduling, based at least on the one or more RTTs, one or more downlink receive time slots of the end device for a first RF gateway of the one or more RF gateways to transmit a downlink message to the end device; and transmitting the downlink message from the backend server to the first RF gateway that sends the downlink message to the end device during the one or more downlink receive time slots.

In some implementations, determining the one or more RF gateways that are candidates for communicating with the end device over the RF link in the LPWAN, comprises: determining a plurality of RF gateways that forwarded, to the backend server, a same uplink message from the end device; determining the one or more RF gateways from the plurality of RF gateways by determining that each of the one or more RF gateways: meets an RF signal quality metric threshold of an RF signal received over the RF link from the end device; and meets a link quality metric threshold of communications over the backhaul link with the backend server.

In one embodiment, a method comprises: determining, at a backend server, one or more RF gateways that are candidates for communicating with an end device over a RF link in a LPWAN; obtaining, at the backend server, for each of the one or more RF gateways, a RTT of communications between the backend server and the RF gateway over a backhaul link; determining, at the backend server, whether at least one of the one or more RTTs exceeds a threshold value; and in response to determining that at least one of the one or more RTTs exceeds the threshold value, increasing, at the backend server, a configured time interval between transmission of an uplink message by the end device and a downlink receive time slot in which the end device is configured to listen for a downlink message.

In some implementations, obtaining for each of the one or more RF gateways, the RTT of communications between the backend server and the RF gateway over a backhaul link, comprises: passively measuring, at the backend server, using a transport layer network protocol or an application layer network protocol, the RTT.

In some implementations, the end device is a battery powered device; and the threshold is less than or equal to the configured time interval.

In some implementations, increasing, at the backend server, the configured time interval comprises: increasing the configured time interval such that the configured time interval is at least greater than a maximum RTT of the one or more RTTs.

In one embodiment, a backend server, comprises: one or more processors; and one or more non-transitory computer-readable storage medium storing instructions that, when executed by the one or more processors, cause the backend server to perform operations comprising: determining a first plurality of RF gateways that forwarded to the backend server an uplink message transmitted by an end device over a RF link in a LPWAN; determining one or more RF gateways of the plurality of RF gateways that are eligible to send a downlink message to the end device over the RF link; and obtaining, for each of the one or more RF gateways, a RTT of communications between the backend server and the RF gateway over a backhaul link; scheduling, based at least on the one or more RTTs, one or more downlink receive time slots of the end device for a first RF gateway of the one or more RF gateways to transmit a downlink message to the end device; and transmitting the downlink message from the backend server to the first RF gateway that sends the downlink message to the end device during the one or more downlink receive time slots.

In some implementations, scheduling, based at least on the one or more RTTs, one or more downlink receive time slots of the end device for the first RF gateway of the one or more RF gateways to transmit the downlink message to the end device, comprises: determining, based at least on the one or more downlink receive time slots, a schedule time interval before sending the downlink message to arrive at the RF gateway from the backend server; and transmitting the downlink message from the backend server to the first RF gateway, comprises: transmitting, after the schedule time interval, the downlink message from the backend server to the first RF gateway.

In some implementations, the operations further comprise: determining whether at least one of the one or more RTTs exceeds a threshold value that is less than or equal to a configured time interval between transmission of the uplink message by the end device and a first downlink receive time slot of the one or more downlink receive time slots; when at least one of the one or more RTTs exceeds the threshold value, increasing the configured time interval.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As discussed above, end devices in a LPWAN may only receive downlink transmissions during a few pre-specified time slots to save on battery life. Failure to consider link quality metrics such as a RTT between a RF gateway and one or more backend servers may result in the downlink transmission missing the downlink slots during which the energy-constrained, end device listens. Implementations of the disclosure relate to adaptively scheduling downlink transmissions to energy-constrained devices in a LPWAN based on the backhaul link RTT between an RF gateway and one or more backend servers. In addition to the RTT, other backhaul link quality metrics such as bandwidth and packet loss rate (PLR) may be considered during scheduling. By virtue of considering the RTT, scheduling may be adjusted to ensure that transmissions to end devices arrive just in time for the downlink time slots. Additionally, this may ensure and that the RF gateway is not overwhelmed with downlink traffic and its buffer is not overflowed.

Figure 1:
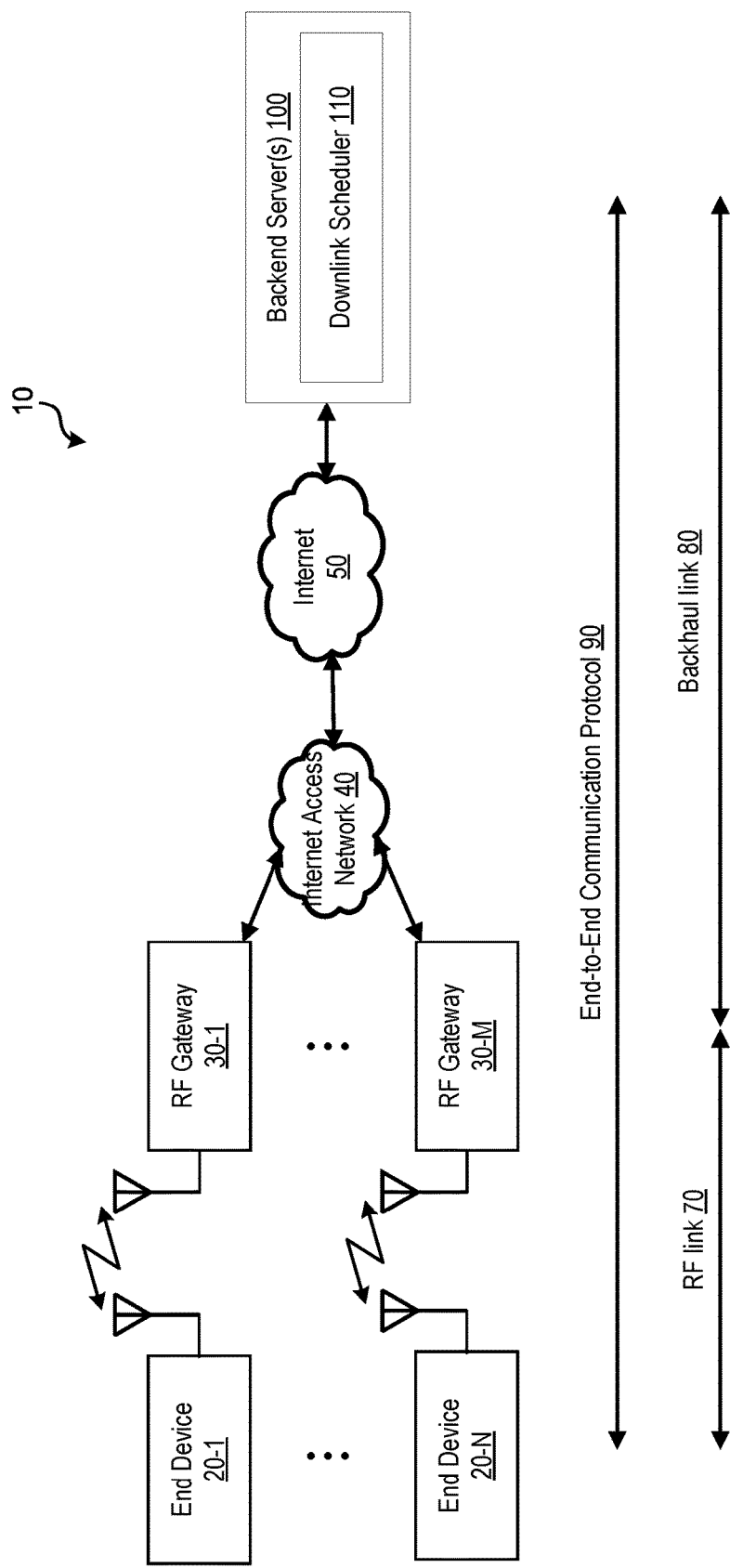
FIG. 1 depicts an example LPWAN system in which the technology described herein may be implemented, in accordance with some implementations of the disclosure.

FIG. 1 depicts an example LPWAN system 10 in which the technology described herein may be implemented, in accordance with some implementations of the disclosure. The LPWAN system 10 includes end devices 20-1 to 20-N (individually referred to as an "end device 20" and collectively referred to as "end devices 20"), RF gateways 30-1 to 30-M (individually referred to as an "RF gateway 30" and collectively referred to as "RF gateways 30"), and one or more backend servers 100. During operation, end devices 20 communicate with RF gateways 30 over RF link 70, and RF gateways 30 communicative with the one or more back end servers 100 over backhaul link 80.

An end device 20 may be any Internet of Things (IoT) device that may benefit from implementing the techniques described herein. For example, end devices 20 may be battery-powered, energy-constrained devices such as sensors, meters, actuators, beacons, and the like that may be deployed in a large geographic area. These devices may be used as environmental sensors, used with industrial equipment, used in smart home applications, etc. During operation, end devices 20 may transmit short messages via RF communication that are received by one or more RF gateways 30. End devices 20 also receive messages from an RF gateway 30 via RF communication. To enable communications with RF gateways 30 over RF link 70, end devices 20 may include an RF transmitter/receiver pair, or an RF transceiver. The RF transceiver may enable communications over long distances. For example it may enable communications over distances of up to 1 kilometer (km), up to 5 km, up to 10 km, up to 30 km, or even greater.

RF gateways 30 are configured to receive uplink messages transmitted by end devices 20 and send them to one or more backend servers 100. As depicted, an RF gateway 30 connects to a backend server 100 via a backhaul link 80 that traverses an Internet access network 40 and the Internet 50 to reach backend server 100. Depending on the system implementation, any suitable backhaul link 80 is used. For example, the backhaul link 80 may utilize wired communications technology (e.g., digital subscriber line (DSL), cable, or fiber-optic), cellular communications technology (e.g., 2G, 3G, 4G, LTE, or 5G.), and/or satellite communications technology (e.g., low-earth orbit (LEO), geosynchronous equatorial orbit (GEO), or medium earth orbit (MEO)). RF gateways 30 also receive downlink messages from one or more backend servers 100 and transmit them to end devices 20 via RF communication over RF link 70. To reduce system cost, an RF gateway 30 may be a constrained device.

A backend server 100 is configured to communicate with RF gateways 30 over the backhaul link 80. Because multiple RF gateways 30 can receive the same RF signal from a single end device 20, more than one RF gateway 30 may forward the same uplink message from the same end device 20 to a backend server 100. In such cases, the backend server 100 may de-duplicate the uplink messages from the end device 20. The backend server 100 is also configured to select the "best" RF gateway 30 among those forwarding the same uplink messages from an end device 20 to forward a downlink message. To this end, the backend server 100 includes a downlink scheduler 110 that is configured to schedule packets in time for downlink slot listening by an end device 20. As further described below, the downlink scheduler 110 considers link quality metrics (LQM) such as latency, bandwidth, and packet loss over backhaul link 80. Latency may be defined as the round trip time (RTT) between two endpoints of a link. The scheduling techniques described herein may be particularly advantageous in the case of backhaul links that have a high RTT (e.g., GEO satellite communication system) or variable RTT (e.g., LEO satellite communication system).

Typically, both layer 1, PHY (physical) layer, and layer 2, MAC (Medium Access Control) layer, run over a link having the same physical characteristic and terminating at end points of the link. However, one unique characteristic of an LPWAN system 10 that utilizes energy-constrained end devices 20 is that a layer 2 protocol may not terminate at an RF Gateway 30. The layer 2 protocol, illustrated as end-to-end (E2E) communication protocol 90, may operate between an end device 20 and one or more backend servers 100, and an RF gateway 30 acts as a packet forwarder. In such cases, the end-to-end layer 2 protocol 90 runs over RF links 70 between an end device 20 and RF gateways 30 and over backhaul links 80 between RF 30 gateways and backend servers 100. The combination of RF gateways 30 acting as packet forwarders and limited listening opportunities of energy-constrained end devices 20 to downlink transmissions requires consideration of backhaul LQM to achieve successful downlink transmission to end devices 20 from backend servers 100.

Figure 2:
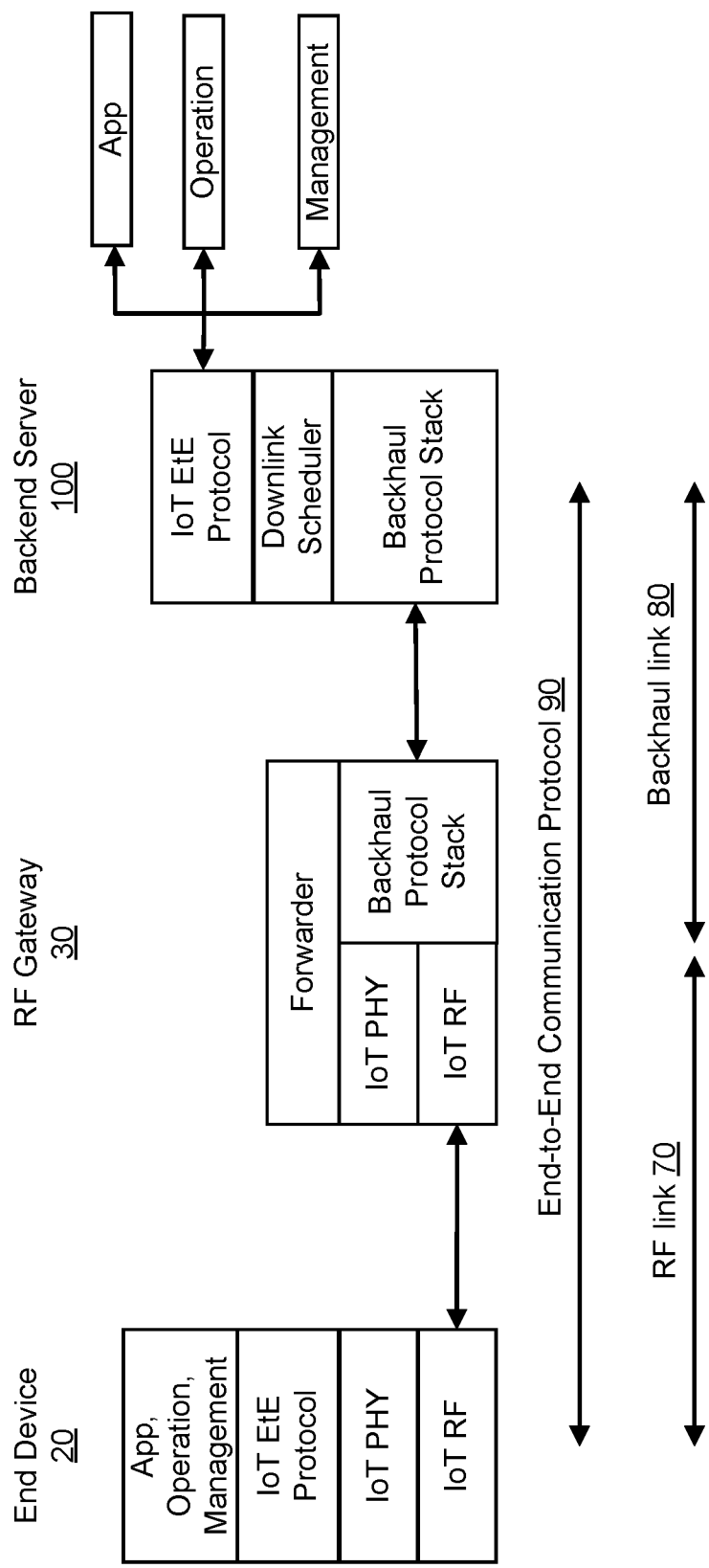
FIG. 2 is a block diagram illustrating the protocol stack of LPWAN system, in accordance with some implementations of the disclosure.

FIG. 2 is a block diagram illustrating the protocol stack of LPWAN system 10, in accordance with some implementations of the disclosure. As depicted, an end device 20 has an IoT RF layer and IoT PHY layer to communicate with RF gateways 30. An IoT end-to-end (EtE) protocol on top of the PHY layer communicates with a backend server 100, and bypasses RF gateways 30. On top of the IoT EtE protocol, IoT applications, operation functions, and management functions run on end device 20, communicating with their counterpart in a backend server 100. An RF gateway 30 implements an IoT RF layer and PHY layer to transmit and receive to and from end devices 20. The packet forwarder function in a RF gateway 30 forwards uplink messages from an end device 20 to the backend server 100 via the backhaul link 80. It transmits downlink messages, received from backend servers 100, to an end device 20 via the RF link 70 according to downlink transmission instruction received from the backend server 100. The RF gateway 30 contains a backhaul protocol stack to communicate with its counterpart in the backend server 100.

As depicted by FIGS. 1-2, a backend server 100 described herein may incorporate the following functions. It may include a backhaul protocol stack to communicate with RF gateways 30. It may also include a downlink scheduler 110 to schedule downlink transmission to end devices 20. The downlink scheduler 110 selects a suitable RF gateway 30, determines downlink transmission settings, including a timestamp for the RF gateway 30, and schedules to send downlink messages together with downlink transmission settings to RF gateways 30. Additionally, the backend server 100 may further include an IoT EtE protocol to communicate with a counterpart end device 20. The IoT EtE protocol may receive uplink messages from end devices 20, extracts higher layer messages, if any, and forward them to applications, operation, and management functions. The applications, operation and management functions may be implemented on the same physical server or on different servers.

An LPWAN system 10 employing end devices 20 to report data to backend servers 100 typically has more traffic in the uplink direction as opposed to the downlink direction. However, there may exist a variety of reasons requiring downlink transmissions to end devices 20. These reasons may include: the end-to-end protocol sends downlink acknowledgement messages to end devices for uplink messages, which requires acknowledgement; a backend server 100 receives downlink messages from application, operation, and management functions, and sends them as downlink messages to end devices 20; or the backend server 100 sends end-to-end protocol commands to end devices for parameter adaptation, link connectivity testing, etc.

There may be several classes of end devices 20 in an LPWAN system 10. Classification may be according to energy efficiency, where the more energy efficient a device, the less power it uses, and the longer its battery life if it is battery powered. Energy savings may depend on how much time an end device 20 stays in a sleep mode, and how often it wakes up and listens to downlink transmissions. The least energy efficient device class may always listen to downlink messages and require a constant power source.

By contrast, the most energy efficient device class may spend most of its time in a sleep mode and wake up when it has information to send to a backend server 100. These end devices may be energy-constrained devices which are powered by a battery and are required to operate for a long time (e.g., on the order of many months, years, or even decades). After transmitting on the uplink, an energy efficient end device 20 may listen for downlink transmissions during a few pre-specified downlink slots. These slots may provide backend servers 100 with the only opportunities to send downlink messages to such end devices 20. If current downlink slots are missed, the backend server 100 may have to wait for the next time an end device 20 wakes up for its uplink transmission. The techniques of the present disclosure are particularly suitable for implementation in such energy-constrained devices operating in an LPWAN system 10.

In a particular implementation, the LPWAN uses the Long Range Wide Area Network (LoRaWAN) protocol for communications, and the end devices 20 include Class A devices.

Figure 3:
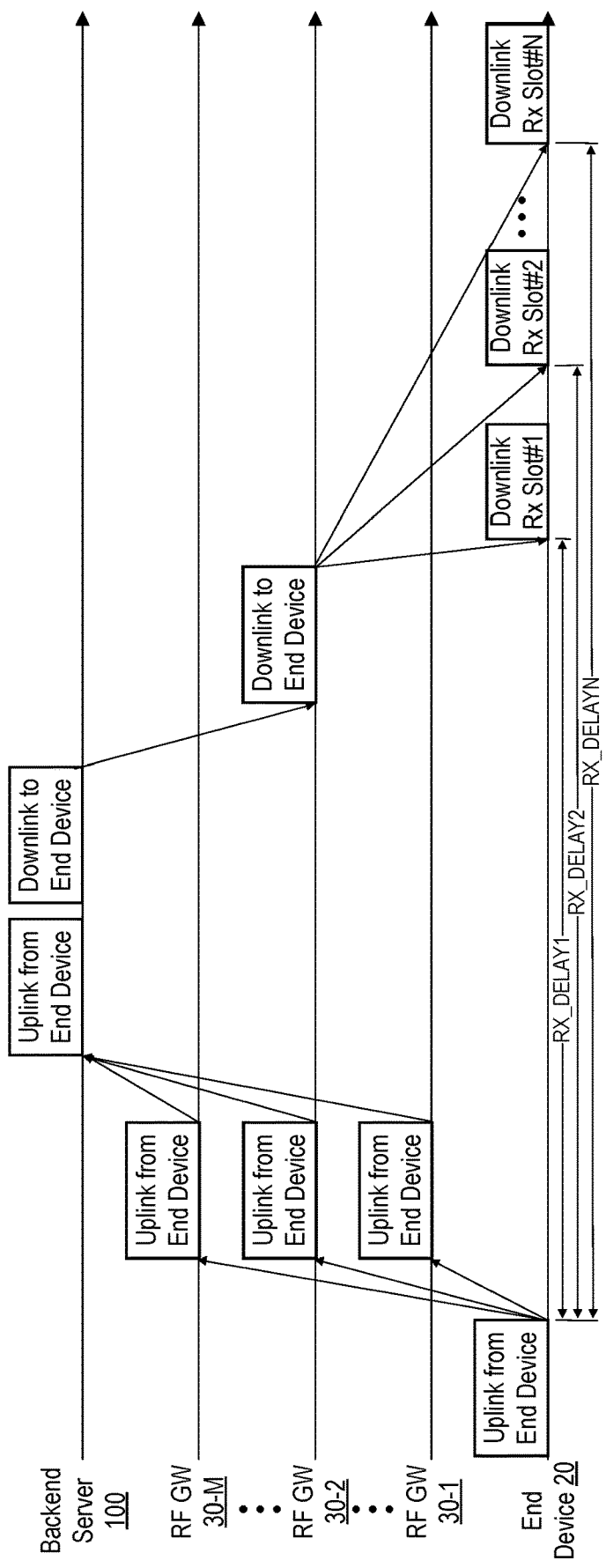
FIG. 3 depicts a timing diagram showing downlink receive slots with respect to uplink transmissions of a constrained end device, in accordance with some implementations of the disclosure.

FIG. 3 depicts a timing diagram showing downlink receive slots with respect to uplink transmissions of a constrained end device 20, in accordance with some implementations of the disclosure. The timing diagram shows timing of uplink and downlink transmissions between an end device 10 and RF gateway 30-1, RF gateway 30-2, RF gateway 30-M, and a backend server 100. Uplink transmission includes transmission of messages from an end device 20 to RF gateways 30 and backend server 100, while downlink transmission is transmission of messages from a backend server 100 and RF gateways 30 to an end device 20.

For example, assume that the transmission range of end device 20 is about 10 kilometers, and RF gateway 30-1, RF gateway 30-2, and RF gateway 30-M are well within this transmission range (substantially less than 10 kilometers away from the end device). In this case, all three gateways 30 receive the uplink message from the end device 20, and the three gateways 30 forward the uplink message to the backend server 100. The backend server de-duplicates the received uplink messages. In this example, assuming the backend server 100 has one downlink transmission destined for the end device 20, the backend server 100 selects one of the RF gateways that received the uplink message to transmit a downlink message to end device 20. In this example, RF gateway 30-2 is selected, and the backend server 100 sends the downlink message to gateway 30-2 via the backhaul link to be transmitted to the end device 20.

In the example of FIG. 3, the end device 20 is an energy-constrained device that listens only for downlink communications during pre-defined downlink Rx (Receive) time slots #1, #2, . . . , #N after its uplink transmission. The downlink Rx slots #1, #2, and #N are respectively RX_DELAY1, RX_DELAY2, and RX_DELAYN time intervals away from the end of the uplink transmission from the end device 20, where RX_DELAY1<RX_DELAY2< . . . <RX_DELAYN. As further discussed below, during system operation, the values of RX_DELAY1, RX_DELAY2 and RX_DELAYN may be specified in advance based on LQM, and configured both in the end device 20 and in the backend server 100. These values may also be dynamically changed during operation of end devices 20 by using EtE protocol commands. The RF gateways 30 may not be aware of the values of RX_DELAY.

The downlink scheduler 110 of backend server 100 selects one or more of the downlink Rx slots, schedules the downlink message, and sends it to the RF gateway 30-2 together with downlink transmission setting information. The gateway 30-2 transmits the downlink message to the end device 20 via the RF link 70 during the one or more pre-scheduled downlink Rx slots.

Figure 4:
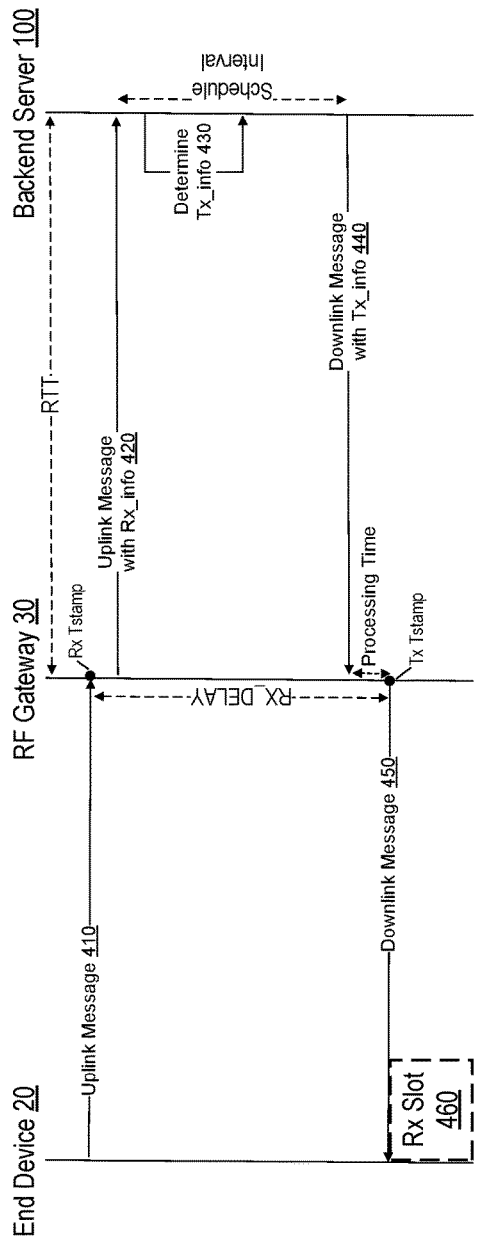
FIG. 4 is a sequence diagram illustrating a process for successfully scheduling downlink transmission to an energy-constrained end device, in accordance with some implementations of the disclosure.

FIG. 4 is a sequence diagram illustrating a process for successfully scheduling downlink transmission to an energy-constrained end device 20, in accordance with some implementations of the disclosure. As depicted, at step 410, the RF gateway 30 receives an uplink message transmitted by the end device 20 over an RF link. The RF gateway 30 records uplink transmission RF signal information at the receiver of the gateway 30 as "Rx_info". The Rx_info may include a timestamp of the reception, "Rx TStamp", recorded by the RF gateway 30. Although a single RF Gateway 30 is depicted in this example for simplicity, there may be multiple RF gateways 30 that receive the uplink transmission message from the end device 30. For simplicity, only one gateway is considered for this example. In alternative implementations, rather than have the RF gateway 30 determine the timestamp of the reception, the energy-constrained end device 20 may include a timestamp in the uplink message that is used for subsequent steps. This alternative may be feasible given the short time required for the RF signal to reach RF Gateway 30 once it is transmitted by end device 20.

At step 420, the RF gateway 30 forwards the uplink message together with Rx_info to the backend server 100. The backend server 100 records the Rx TStamp included in the message. Assuming that the backend server 100 has a downlink message to be transmitted to the end device 20, at step 430 the backend server 100 may determine Tx_info including a downlink transmission timestamp, "Tx TStamp". The value of Tx TStamp may be calculated based on Equation (1)

$$Tx\ TStamp = Rx\ TStamp + RX\_DELAY \qquad (1)$$

Where the RX_DELAY is the value of a pre-specified time interval between transmission of the uplink message and a downlink Rx slot 460 in which the end device 20 is listening for downlink messages.

After a time interval, referred to as "Schedule Interval", the backend server 100 schedules the downlink message to be sent to the RF gateway 30. The value of Schedule Interval must be chosen carefully. In accordance with implementations, the schedule interval value is optimized. If this value is too small, the downlink message may be sent too early to the RF gateway 30, and the scheduled message may sit in the downlink queues at the gateway waiting to be transmitted to the end device. If the RF gateway 30 is a constrained device serving a great number of end devices 20, it may be overwhelmed by downlink messages and downlink queue can be overflowed and downlink messages can be dropped. On the other hand, if the Schedule Interval value is too large, downlink transmission may miss the scheduled Downlink Rx slot 460.

After the Schedule Interval, at step 440 the downlink message is sent by the backend server 100 to the RF gateway 30 together with Tx_info. The RF gateway 30 receives the downlink message, performs some processing that takes some Processing Time, and at step 450 transmits it to the end device at Tx TStamp according to a downlink transmission setting included in Tx_info.

In the foregoing example, to have a successful downlink transmission to an energy-constrained end device 20, the following inequality needs to be satisfied:

$$RX\_DELAY > RTT + \text{Schedule Interval} + \text{Processing Time} \quad (2)$$

Where RX_DELAY is the value of a pre-specified time interval between transmission of the uplink message and a downlink Rx slot 460 in which the end device 20 is listening for downlink messages; RTT is the Round Trip Time of the backhaul link between a RF gateway 30 and the backend server 100; Schedule Interval is the time interval between the reception of an uplink message and the transmission of a downlink message at the backend server 100; and Processing Time is the processing time required by the RF gateway 30 from the reception of a downlink message to the time the gateway is ready to transmit the downlink message in the RF link to the end device 20.

Figure 5:
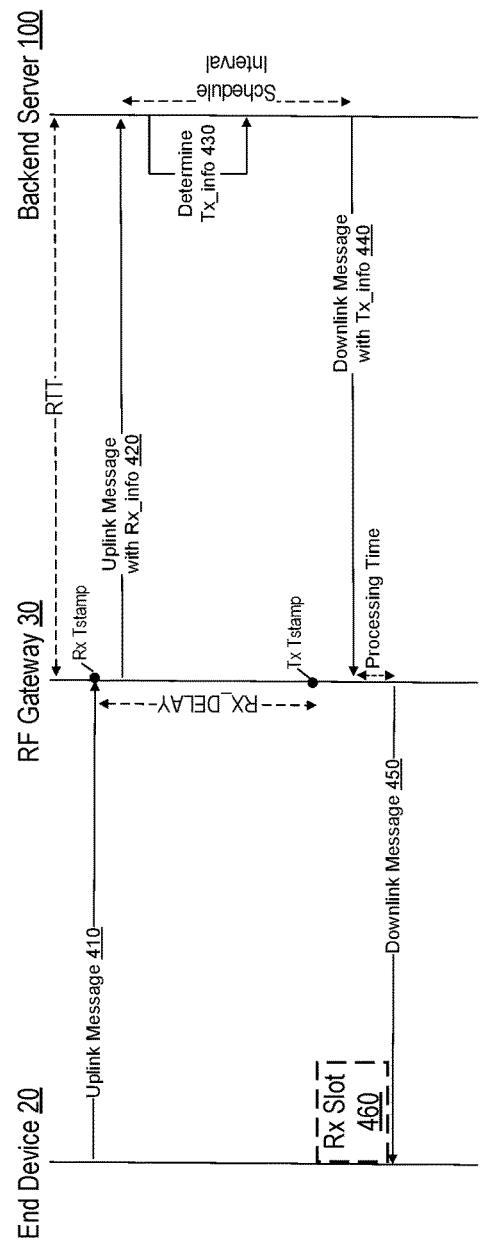
FIG. 5 is a sequence diagram illustrating a failed downlink transmission to an energy-constrained end device.

FIG. 5 is a sequence diagram illustrating a failed downlink transmission to an energy-constrained end device 20. In this example, the sum of RTT, Schedule Interval and Processing Time is greater than RX_DELAY. The downlink message transmitted at step 460 arrives at the end device 20 after the termination of the downlink Rx Slot 460 in which the end device 20 is listening for downlink messages. This failure may be due to RX_DELAY being too small. For example, the RTT may be greater than RX_DELAY. This failure may also be due to the Schedule Interval being too big when, for example, the backend server 100 does not take into account RTT and/or Processing Time at the RF Gateway 30.

As the foregoing examples illustrate, in order to ensure proper scheduling of downlink transmissions from a backend server 100 to a power-constrained end device 20 in a LPWAN, it is important to consider LQM including RTT. There are two scenarios that may be considered for successful downlink transmissions to energy-constrained end devices 20: before deployment of an end device 20 to the field, and after the end device 20 has been deployed. Deployment of the end device may refer to configuration of the end device 20 to communicate over the LPWAN, and, in some cases, installation of the end device 20.

Figure 6:
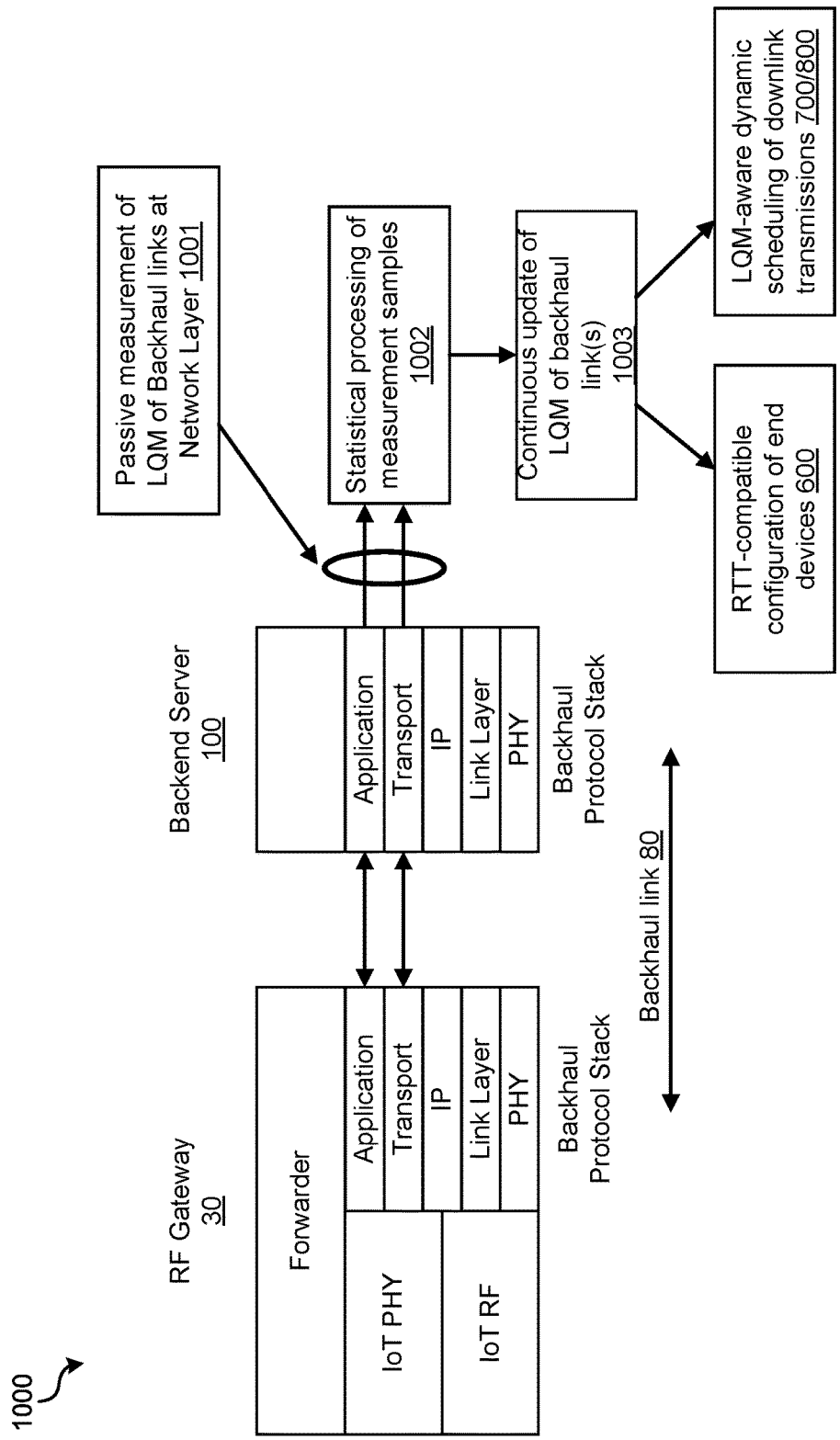
FIG. 6 is a flow diagram illustrating a particular example method of a backend server measuring and continuously updating LQM that are used for RTT-compatible configuration of end devices and/or LQM-aware dynamic scheduling of downlink transmissions, in accordance with some implementations of the disclosure.

FIG. 6 is a flow diagram illustrating a particular example method 1000 of a backend server 100 measuring and continuously updating LQM that are used for RTT-compatible configuration of end devices (e.g., method 600) and/or LQM-aware dynamic scheduling of downlink transmissions (e.g., methods 700 or 800), in accordance with some implementations of the disclosure.

Operation 1001 includes passively measuring the LQM of the backhaul link 80 at a network layer. During operation, the backend server 100 may passively measure LQM, including RTT, of a given RF gateway 30 on a backhaul link 80 between the RF gateway 30 and the backend server 100. The LQM may be passively measured as new data is exchanged between RF gateway 30 and the backend server 100. The measured LQM may include RTT. The measured LQM may also include bandwidth (e.g., data rate) and/or a packet loss rate. In implementations, backend server 100 may use an application programming interface (API) to obtain real-time values of protocol parameters and statistics. TCP and QUIC may provide an API to allow external applications to read real-time value of TCP/QUIC protocol parameters and statistics. For example, RTT may be calculated continuously for each connection as long as data is exchanged on those connections. TCP calculates RTT for packets exchanged on a per-connection basis, and computes the exponential moving average of these measurements, referred to as SRTT (Smoothed RTT). The BBR congestion control algorithm explicitly measures RTT during the ProbeRTT period.

In some implementations, depicted by FIG. 6, the backend server 100 passively measures LQM using a transport layer network protocol. The transport layer network protocol may be the Transmission Control Protocol (TCP), the TCP Bottleneck Bandwidth and Round-trip propagation time (BBR), or QUIC. TCP and QUIC provide reliable in order delivery of data between two end points. As TCP transports user data, the TCP computes protocol parameters and statistics continuously. As such, LQM may be derived explicitly or implicitly from TCP parameters and statistics. By virtue of using the aforementioned transport layer network protocols to passively measure LQM, there is no requirement for active measurement by the backend server 100 using measurement probe packets.

In some implementations, depicted by FIG. 6, the backend server 100 passively measures LQM at the application layer. There is a backhaul protocol running between an RF gateway 30 and a backend server 100 to transport data over a backhaul link 80. Even when there is no data to transmit between the gateway 30 and the backend server 100, keep-alive packets may be required to exchange in order to maintain Network Address Translation (NAT) binding of the gateway at the Internet access network 40. In this case, there is no need to use active measurement probe packets. LQM may be passively and continuously measured from the packet exchange between the gateway 30 and the backend server 100. For example, when the backend server 100 needs to send a data packet with packet number "A" to the gateway 30, it may store the transmit time of the packet, "A". When the backend server receives the acknowledgement to the packet, "A" from the gateway, it may compute one RTT sample from the transmit time of the data packet and the receive time of the acknowledgement. It should be noted that LQM may be measured at one or both of the application layer and the transport layer.

Operation 1002 includes statistically processing LQM measurement samples. The samples from the LQM measurements may be processed statistically to generate a statistically meaningful estimate of LQM. For example, a weighted moving averages of passively measured RTT values may be used to determine a present RTT for a given gateway. The Exponentially Weighted Moving Average (EWMA) for a LQM measurement n, given by Equation (3) below, is one example method of determining a weighted moving average.

$$EWMALQM(n) = \text{alpha} * LQM(n) + (1-\text{alpha}) * EWMALQM(n-1) \quad (3)$$

Where alpha is used to control how much emphasis is given to current value with respect to the history, and n−1 indicates the prior measurement of the LQM.

Operation 1003 includes continuously updating LQM of the backhaul link(s). After the measurement samples of LQM are processed, the current LQM may be updated at the backend server 100 (e.g., by updating one or more LQM values stored in memory or other storage). This passive measurement and updating of LQM parameters may be performed for every gateway, before, during, and/or after configuration of RTT-compatible end devices and/or LQM-aware dynamic scheduling of downlink transmissions.

In alternative implementations, active measurements of LQM may be made by the backend server 100. For example, the backend server 100 may use packet probes to the gateway to actively measure LQM.

Figure 7:
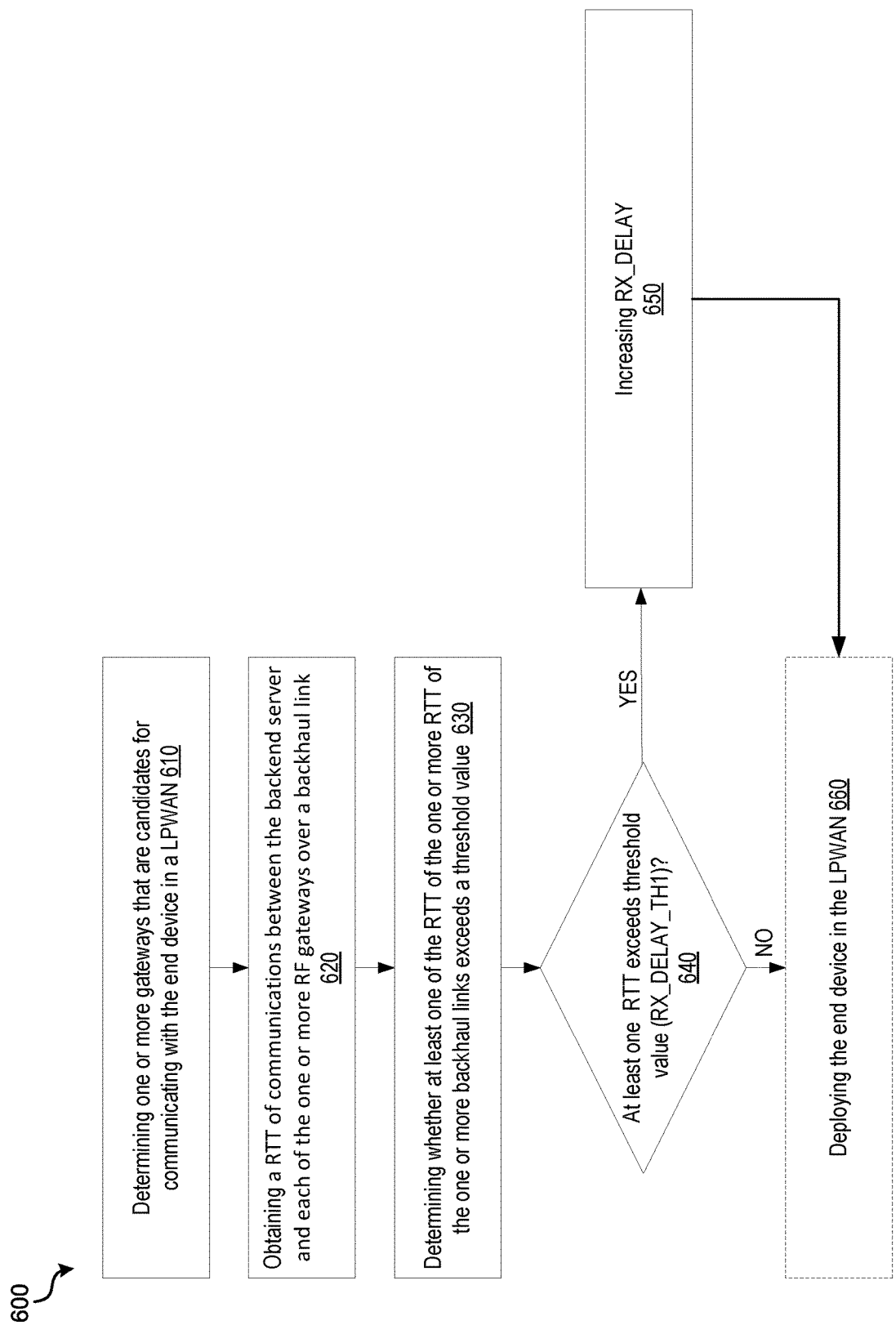
FIG. 7 is a flow diagram illustrating an example method that may be implemented by a backend server to perform RTT-compatible configuration of end devices before deployment in a LPWAN, in accordance with some implementations of the disclosure.

FIG. 7 is a flow diagram illustrating an example method 600 that may be implemented by a backend server 100 to perform RTT-compatible configuration of end devices 20 before deployment in a LPWAN, in accordance with some implementations of the disclosure. Operation 610 includes determining one or more gateways that are candidates for communicating with the end device in the LPWAN. The determination may be based on geographical locations of the end device and the gateways. The backend server 100 may know the geographical locations of gateways 30 and their approximate coverage areas. Given the geographical location of an end device to be deployed, the backend server may determine a list of one or more candidate gateways 30 that may receive uplink transmissions from the end device 20. For example, the coverage of a gateway 30 may be approximated by a circle of "X" km radius centered at the location of the gateway, and it may be determined which circles of the gateway 30 contain the end device 20. A list of candidate gateways may be generated.

Operation 620 includes obtaining a RTT of communications between the backend server and each of the one or more RF gateways over a backhaul link. The RTT may be obtained from one or more LQMs stored in a memory or other storage of backend server 100. The RTT may have been previously measured and updated as discussed above with reference to FIG. 6.

Operation 630 includes determining whether at least one of the one or more RTTs exceeds a threshold value. This threshold may be referred to as "RX_DELAY_TH1". From the continuous measurement of backhaul link LQM, the RTT of each gateway of the one or more candidate gateways (e.g., in the candidate list) may be obtained. The maximum value of RTT may be determined from the one or more RTTs, and the maximum RTT may be compared to a threshold value, RX_DELAY_TH1, which is equal to or less than RX_DELAY, the configured time interval between transmission of an uplink message by the end device and a downlink reception slot in which the end device listens for downlink messages. If none of the RTT is less than the threshold (decision 640), at operation 660, the device may be deployed in the LPWAN without requiring any RTT-compatible configuration before deployment. In some implementations, the threshold value RX_DELAY_TH1 is less than RX_DELAY such that there is some margin to make sure downlink transmission to the end device are feasible after the deployment. For example, RX_DELAY_TH1 may be configured as 95% of RX_DELAY, 90% of RX_DELAY, 85% of RX_DELAY etc.

If at least one of the RTT (e.g., maximum RTT) is greater than RX_DELAY_TH1 (decision 640), RX_DELAY is increased at operation 650. RX_DELAY is increased accordingly to be compatible with backhaul RTTs of all the gateways to which the end device may be able to transmit. RX_DELAY may be increased to exceed the maximum RTT with some margin of safety. For example, RX_DELAY may be updated to be 10% greater than the maximum RTT, 20% greater than the maximum RTT, etc. The new value of RX_DELAY may be updated in both the end device and the backend server before the deployment of the device. For example, before deployment, a user (e.g., installer, supplier, or other user) of the end device 20 may look up the updated value of RX_DELAY maintained at the backend server, and configure the end device to use this new value of RX_DELAY. In such an implementation, the backend server may transmit the updated value of RX_DELAY to a device (e.g., mobile device) of the user. In this manner, the end device 20 may increase a pre-specified time interval between transmission of an uplink message by the end device and a downlink reception slot in which the end device listens for downlink messages. As such, the end device may be configured be compatible with gateways with backhaul link high RTT before its deployment.

Operation 660 includes deploying the end device in the LPWAN. Deploying the end device may include the backend server exchanging encryption keys for use with the end device, and transmitting network configuration information for use with the end device. Deployment may be performed using a device of an installer that communicates with the backend server. As such by virtue of implementing method 600, the end device is configured to be compatible with gateways with backhaul link high RTT before their deployment.

Figure 8:
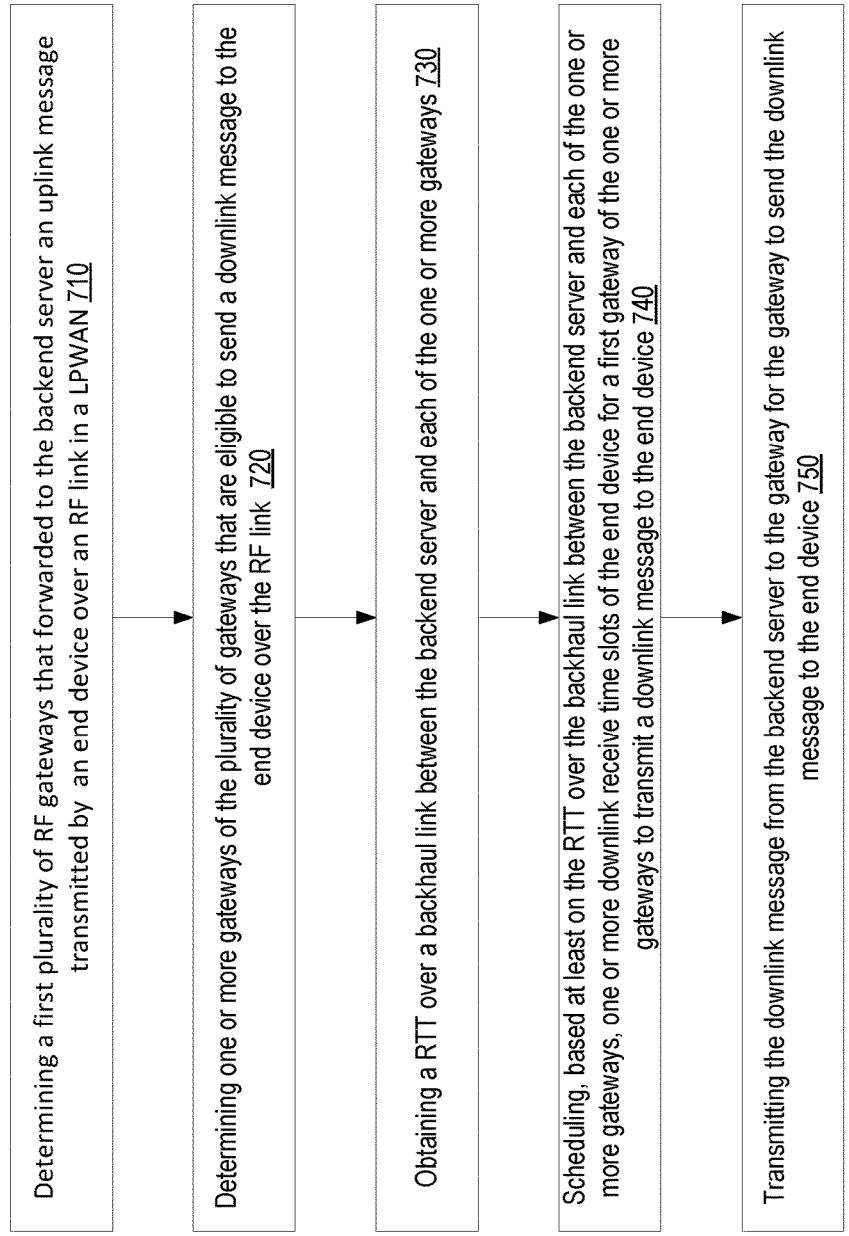
FIG. 8 is a flow diagram illustrating an example method that may be implemented by a backend server for LQM-aware dynamic scheduling of downlink transmissions to an end device, after deployment of the end device, in accordance with some implementations of the disclosure.

FIG. 8 is a flow diagram illustrating an example method 700 that may be implemented by a backend server 100 for RTT-aware dynamic scheduling of downlink transmissions to an end device, after deployment of the end device, in accordance with some implementations of the disclosure. Operation 710 includes determining a first plurality of RF gateways that forwarded to the backend server an uplink message transmitted by an end device over an RF link in a LPWAN. For example, as depicted by FIG. 3, an end device 20 may forward the same uplink message to multiple RF gateways.

Operation 720 includes determining one or more RF gateways of the plurality of RF gateways that are eligible to send a downlink message to the end device over the RF link. To this end, the server may determine that each of the one or more RF gateways: meets an RF signal quality metric threshold of an RF signal received over the RF link from the end device; and meets a LQM threshold of communications over the backhaul link with the backend server.

The backend server may determine that each gateway meets the RF signal quality metric threshold by obtaining RF reception information from each of the plurality of gateways. For example, as depicted by FIG. 4, each gateway may forward the uplink message together with the corresponding Rx_info to the backend server, where the Rx_info contains RF signal information about the reception of the uplink transmission such as RxTStamp, Signal to Noise Ratio (SNR) and/or Received Signal Strength Indicator (RSSI), etc. If thresholds for the RF signal quality metrics are not met, a gateway may be determined to be unreachable by the end device.

The backend server may determine that each gateway meets the LQM threshold by obtaining LQM there were previously determined as discussed above with reference to FIG. 6, and comparing the LQM to thresholds. For example, the backend server may obtain a bandwidth and packet loss rate for each of the RF gateways by continuously monitoring the backhaul LQM using the techniques described herein. If the backhaul LQM do not meet the thresholds, the gateway may be determined to not be reliable.

As such, by following the foregoing process, the backend server may obtain a list of candidate gateways that receive acceptable RF signal quality from the end device and can reliably communicate with the backend server.

Operation 730 includes obtaining, for each of the one or more RF gateways, a RTT of communications between the backend server and the RF gateway over the backhaul link. The RTT may be obtained as discussed above.

Operation 740 includes scheduling, based at least on the one or more RTTs, one or more downlink receive time slots of the end device for a first RF gateway of the one or more RF gateways to transmit a downlink message to the end device. In some implementations, the backend server selects a gateway having the lowest backhaul RTT to transmit the downlink message. Prior to scheduling, the backend server may also determine that the RTT of the selected gateway does not exceed a threshold value that is less than or equal to a configured time interval between transmission of the uplink message by the end device and one of the downlink receive time slots. In some instances, prior to scheduling, the backend server may determine that at least one of the RTTs exceeds this threshold value (e.g., RX_DELAY or some threshold below RX_DELAY). In such instances, the backend server may transmit an end-to-end protocol command to the end device to increase the configured time interval such that it exceeds all RTTs.

Operation 750 includes transmitting the downlink message from the backend server to the first RF gateway that sends the downlink message to the end device during the one or more downlink receive time slots. In some implementations, the backend server determines based at least on the one or more downlink receive time slots, a schedule time interval (e.g., "Schedule Time Interval" as illustrated by FIG. 4), and the downlink messaged is transmitted by the backend server after the schedule time interval. The backend server may select the schedule interval such that the downlink message arrives in time at the gateway to be transmitted in the downlink Rx slots to the end device. The value of the schedule interval may take into account the backhaul link RTT of the gateway and the gateway's processing time requirement for downlink transmission at the gateway (e.g., as depicted by FIG. 4). It may be preferable not to release the downlink message too early to the gateway. If it is sent too soon, the message may sit in a downlink queue of the gateway for a long time, and the queue may overflow if the number of end devices served by the gateway is large and the gateway's resource are constrained.

Figure 9:
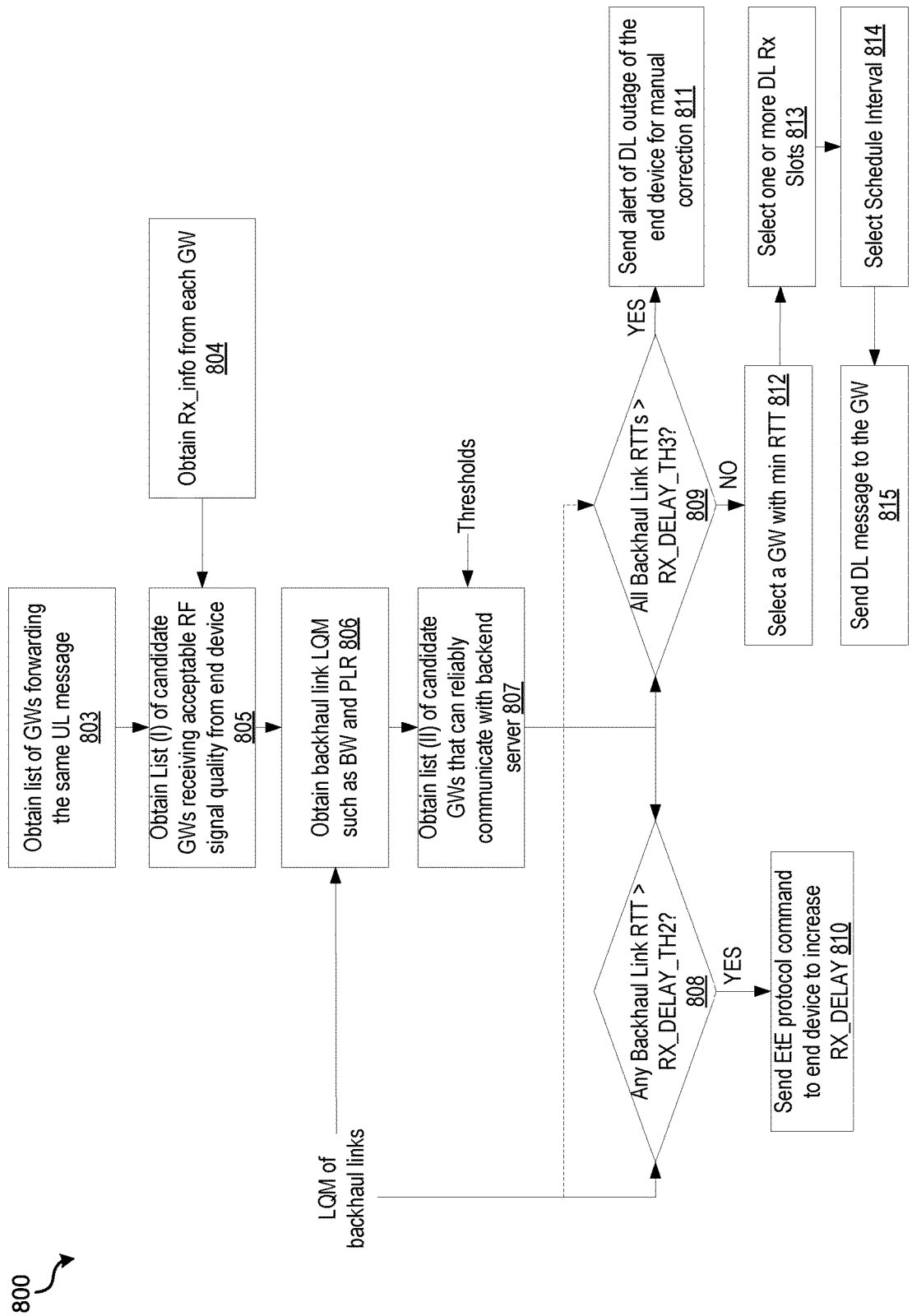
FIG. 9 is a flow diagram illustrating a particular example method that may be implemented by a backend server for LQM-aware dynamic scheduling of downlink transmissions to an end device, after deployment of the end device, in accordance with some implementations of the disclosure.

FIG. 9 is a flow diagram illustrating a particular example method 800 that may be implemented by a backend server 100 for LQM-aware dynamic scheduling of downlink transmissions to an end device, after deployment of the end device, in accordance with some implementations of the disclosure. Step 803 includes obtaining a list of gateways (GWs) that forward the same uplink (UL) message from the end device. Step 804 includes obtaining Rx_info, RF reception information at each gateway in the list, where Rx_info includes RF signal quality metrics from the end device received at the gateway. Step 805 includes obtaining the list (I) of candidate gateways which receive the acceptable RF signal quality from the end device. Step 806 includes obtaining the backhaul link LQM such as Bandwidth (BW) and Packet Loss Rate (PLR) for each of the gateway in the list from continuous monitoring of backhaul link LQM, and comparing them to LQM thresholds to determine which gateways can reliably communicate with the backend server. Step 807 includes obtaining, from the candidate GWs of list (I), the list (II) of candidate gateways which can reliably communicate with the backend server.

Prior to decisions 808-809, backhaul link RTT may be obtained for each gateway in list (II). Decisions 808 and 809 include checking the current backhaul RTT values of the gateways in the list against two thresholds: (i) "RX_DELAY_TH2" and (ii) "RX_DELAY_TH3". In this example, RX_DELAY_2 is the threshold for backhaul link RTT to increase the value of RX_DELAY in the end device and the backend server. It is to prevent the downlink transmission outage. During downlink transmission outage, downlink transmission will miss downlink Rx slots listening by the end device and downlink transmissions to the end device is no longer feasible. If the outage happens, it may require manual reconfiguration of the end device. In this example, RX_DELAY_TH3 is the threshold for backhaul link RTT above which there will be downlink transmission outage to the end device. Depending on the implementation, RX_DELAY_TH1, RX_DELAY_TH2, and RX_DELAY_TH3 may use the same threshold value or different threshold values.

If any backhaul link RTT exceeds RX_DELAY_TH2 (decision 808), step 810 includes sending an end-to-end protocol command to the end device to increase RX_DELAY. If all backhaul link RTTs exceed RX_DELAY_TH3 (decision 809), step 811 includes sending an alert to the operator of the device about downlink (DL) transmission outage for manual correction. If there are one or more gateways with backhaul RTT less than RX_DELAY_TH3 (decision 809), step 812 includes selecting a gateway with the lowest backhaul RTT from the list. Step 813 includes selecting one or more downlink Rx slots for downlink transmissions to the end device. Step 814 includes selecting the Schedule Interval so that the downlink message arrives in time at the gateway to be transmitted in the downlink Rx slots to the end device. Step 815 includes sending the downlink message to the gateway after the Schedule Interval.

Figure 10:
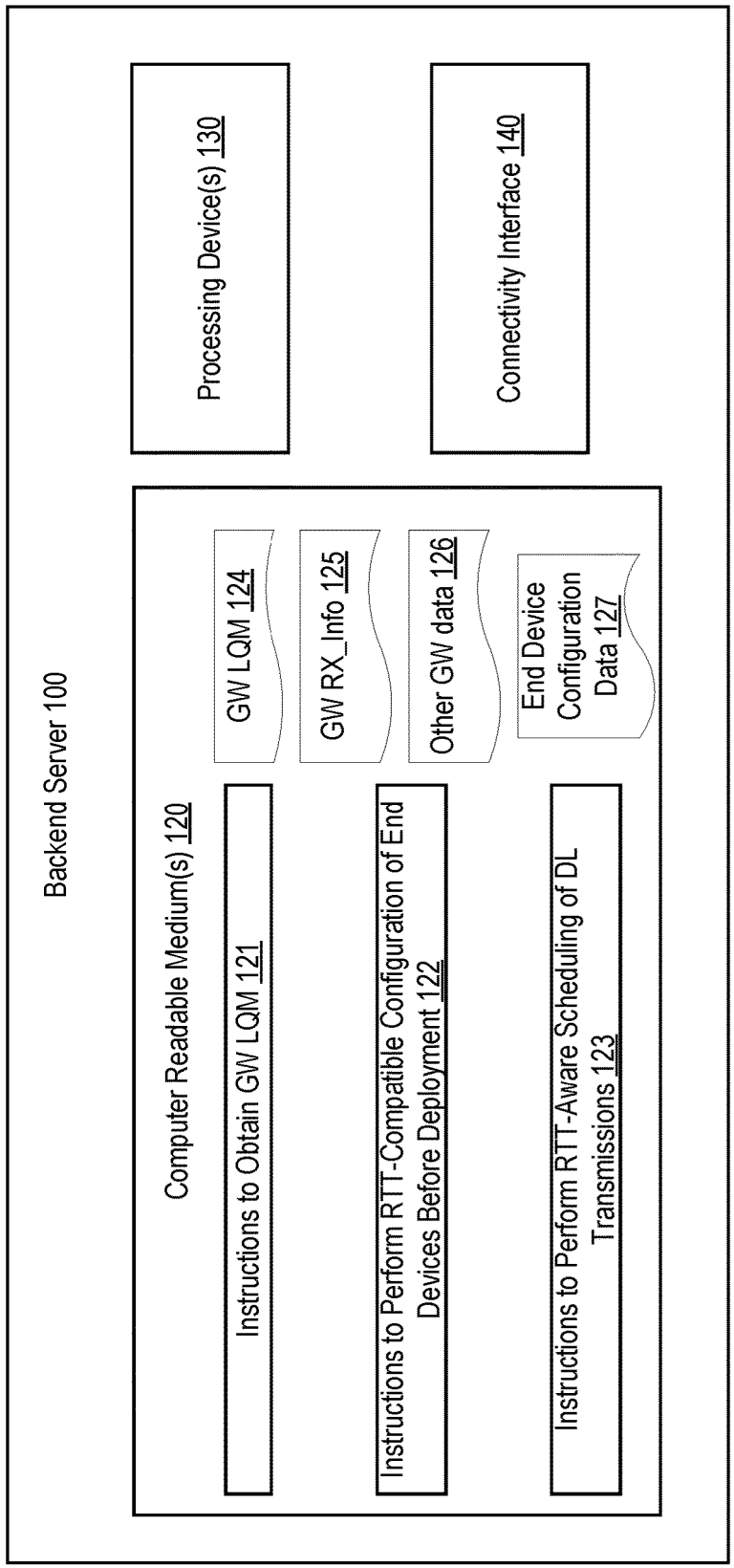
FIG. 10 is a block diagram illustrating some example components of a backend server, in accordance with some implementations of the disclosure.

FIG. 10 is a block diagram illustrating some example components of a backend server 100, in accordance with some implementations of the disclosure. The backend server 100 may include one or more computer readable mediums 120, one more processing devices 130, and a connectivity interface 140. The connectivity interface 140 may enable communications over a backhaul link with RF gateways 30. It may also enable communications with other devices.

The one or more computer readable mediums 120 are configured to store data and instructions executable by the one more processing devices 130 to perform the methods (e.g., method 600, 700, 800, and/or 1000) described herein. For example, the one or more computer readable mediums 120 may store instructions 121 that are executable by the one or more processing devices 130 to cause the backend server to obtain GW LQM. The one or more computer readable mediums 120 may also store instructions 122 that are executable by the one or more processing devices 130 to cause the backend server to perform RTT-compatible configuration of end devices 20 before deployment. The one or more computer readable mediums 120 may further store instructions 123 that are executable by the one or more processing devices 130 to cause the backend server to perform RTT-aware scheduling of DL transmissions. The data stored at the backend server 100 may include GW LQM 124 (e.g., RTT, PLR, and/or BW data that is continuously updated in a database or other suitable data structure), GW RX_Info 125 (e.g., received with uplink messages transmitted by the GWs), other GW data 126 (e.g., networking data, geographical location data, etc.), end device configuration data 127 (e.g., scheduling data such as RX_DELAY, encryption keys, geographical location data, etc.) and other data needed to implement the methods of the present disclosure.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A backend server, comprising:
one or more processors; and
one or more non-transitory computer-readable storage medium storing instructions that, when executed by the one or more processors, cause the backend server to perform operations comprising:
determining one or more radio frequency (RF) gateways that are candidates for communicating with an end device over a RF link in a low-power wide-area network (LPWAN), the end device being energy-constrained and configured to listen for downlink communications only during pre-specified time slots after uplink transmission by the end device;
obtaining, for each of the one or more RF gateways, a round trip time (RTT) of communications between the backend server and the RF gateway over a backhaul link;
determining whether at least one of the one or more RTTs exceeds a threshold value that is less than or equal to a configured time interval for the end device, the configured time interval corresponding to a time between transmission of an uplink message by the end device and a downlink receive time slot in which the end device is configured to listen for a downlink message, scheduled by the backend server, that is transmitted by the one or more RF gateways; and
when at least one of the one or more RTTs exceeds the threshold value, increasing the configured time interval.

2. The backend server of claim 1, wherein obtaining for each of the one or more RF gateways, the RTT of communications between the backend server and the RF gateway over the backhaul link, comprises: passively measuring, using a transport layer network protocol, the RTT.

3. The backend server of claim 2, wherein passively measuring, at the backend server, using the transport layer network protocol, the RTT, comprises: reading, via an application programming interface (API) provided for the transport layer network protocol, real time values of protocol parameters or statistics corresponding to the RTT.

4. The backend server of claim 1, wherein obtaining for each of the one or more RF gateways, the RTT of communications between the backend server and the RF gateway over the backhaul link, comprises: passively measuring, using an application layer network protocol, the RTT.

5. The backend server of claim 4, wherein passively measuring, using the application layer network protocol, the RTT, comprises:
transmitting a data packet from the backend server to the RF gateway;
in response to transmitting the data packet, receiving an acknowledgement at the backend server from the RF gateway; and
determining the RTT based on a transmission time of the data packet and a reception time of the acknowledgement.

6. The backend server of claim 1, wherein the end device is a battery powered device.

7. The backend server of claim 1, wherein increasing the configured time interval comprises: increasing the configured time interval such that the configured time interval is at least greater than a maximum RTT of the one or more RTTs.

8. The backend server of claim 7, wherein the operations further comprises: after increasing the configured time interval, deploying the end device in the LPWAN.

9. The backend server of claim 7, wherein determining one or more RF gateways that are candidates for communicating with the end device over the RF link in the LPWAN, comprises:
 determining a geographical location of the end device; and
 determining that the geographical location is within a coverage area where each of the one or more RF gateways is capable of receiving uplink transmissions form the end device.

10. The backend server of claim 1, wherein the operations further comprise:
 scheduling, based at least on the one or more RTTs, one or more downlink receive time slots of the end device for a first RF gateway of the one or more RF gateways to transmit a downlink message to the end device; and
 transmitting the downlink message from the backend server to the first RF gateway that sends the downlink message to the end device during the one or more downlink receive time slots.

11. The backend server of claim 10, wherein determining the one or more RF gateways that are candidates for communicating with the end device over the RF link in the LPWAN, comprises:
 determining a plurality of RF gateways that forwarded, to the backend server, a same uplink message from the end device;
 determining the one or more RF gateways from the plurality of RF gateways by determining that each of the one or more RF gateways:
  meets an RF signal quality metric threshold of an RF signal received over the RF link from the end device; and
  meets a link quality metric threshold of communications over the backhaul link with the backend server.

12. A method, comprising:
 determining, at a backend server, one or more radio frequency (RF) gateways that are candidates for communicating with an end device over a RF link in a low-power wide-area network (LPWAN), the end device being energy-constrained and configured to listen for downlink communications only during pre-specified time slots after uplink transmission by the end device;
 obtaining, at the backend server, for each of the one or more RF gateways, a round trip time (RTT) of communications between the backend server and the RF gateway over a backhaul link;
 determining, at the backend server, whether at least one of the one or more RTTs exceeds a threshold value that is less than or equal to a configured time interval for the end device, the configured time interval corresponding to a time between transmission of an uplink message by the end device and a downlink receive time slot in which the end device is configured to listen for a downlink message, scheduled by the backend server, that is transmitted by the one or more RF gateways; and
 in response to determining that at least one of the one or more RTTs exceeds the threshold value, increasing, at the backend server, the configured time interval.

13. The method of claim 12, wherein obtaining for each of the one or more RF gateways, the RTT of communications between the backend server and the RF gateway over the backhaul link, comprises: passively measuring, at the backend server, using a transport layer network protocol or an application layer network protocol, the RTT.

14. The method of claim 12, wherein: the end device is a battery powered device.

15. The method of claim 14, wherein increasing, at the backend server, the configured time interval comprises: increasing the configured time interval such that the configured time interval is at least greater than a maximum RTT of the one or more RTTs.

16. A backend server, comprising:
 one or more processors; and
 one or more non-transitory computer-readable storage medium storing instructions that, when executed by the one or more processors, cause the backend server to perform operations comprising:
  determining a first plurality of radio frequency (RF) gateways that forwarded to the backend server an uplink message transmitted by an end device over a RF link in a low-power wide-area network (LPWAN), the end device being energy-constrained and configured to listen for downlink communications only during pre-specified time slots after uplink transmission by the end device;
  determining one or more RF gateways of the plurality of RF gateways that are eligible to send a downlink message to the end device over the RF link;
  obtaining, for each of the one or more RF gateways, a round trip time (RTT) of communications between the backend server and the RF gateway over a backhaul link;
  determining whether any of the one or more RTTs exceeds a threshold value that is less than or equal to a configured time interval, the configured time interval corresponding to a time between transmission of the uplink message by the end device and a first downlink receive time slot of one or more downlink receive time slots in which the end device is configured to listen for a downlink message;
  in response to determining that none of the RTTs exceeds the threshold value, scheduling, based at least on the one or more RTTs, the one or more downlink receive time slots of the end device for a first RF gateway of the one or more RF gateways to transmit a downlink message to the end device; and
  transmitting the downlink message from the backend server to the first RF gateway to send to the end device during the one or more downlink receive time slots.

17. The backend server of claim 16, wherein:
 scheduling, based at least on the one or more RTTs, one or more downlink receive time slots of the end device for the first RF gateway of the one or more RF gateways to transmit the downlink message to the end device, comprises: determining, based at least on the one or more downlink receive time slots, a schedule time interval before sending the downlink message to arrive at the RF gateway from the backend server; and
 transmitting the downlink message from the backend server to the first RF gateway, comprises: transmitting, after the schedule time interval, the downlink message from the backend server to the first RF gateway.

18. The backend server of claim 16, wherein the end device is a battery powered device.

* * * * *